United States Patent [19]

Charng

[11] Patent Number: 5,299,342
[45] Date of Patent: Apr. 5, 1994

[54] WINDSCREEN WIPER CONNECTING ELEMENT

[75] Inventor: Cedric S. K. Charng, Taipei City, Taiwan

[73] Assignee: China Wiper Special Rubber Co. Ltd., Taipei, Taiwan

[21] Appl. No.: 893,390

[22] Filed: Jun. 4, 1992

[30] Foreign Application Priority Data

Feb. 19, 1992 [GB] United Kingdom ............. 9203644.1

[51] Int. Cl.$^5$ ................................................. B60S 1/40
[52] U.S. Cl. ........................... 15/250.32; 15/250.31; 403/24
[58] Field of Search ........... 15/250.32, 250.42, 250.35, 15/250.31; 403/24

[56] References Cited

U.S. PATENT DOCUMENTS

| 2,620,503 | 12/1952 | Boothby | 15/250.32 |
| 2,728,934 | 1/1956 | Krohm | 15/250.32 |
| 2,860,364 | 11/1958 | Krohm | 15/250.35 |
| 3,122,770 | 3/1964 | Krohm | 15/250.35 |
| 3,837,033 | 9/1974 | van den Berg et al. | 15/250.32 |
| 4,180,885 | 1/1980 | Thornton et al. | 15/250.32 |
| 4,318,200 | 3/1982 | Bauer et al. | 15/250.32 |
| 4,697,297 | 10/1987 | Kobayashi | 15/250.32 |
| 4,878,263 | 11/1989 | Raymond | 15/250.32 |

FOREIGN PATENT DOCUMENTS

| 1934195 | 1/1971 | Fed. Rep. of Germany ... 15/250.32 |
| 2410595 | 11/1975 | Fed. Rep. of Germany ... 15/250.32 |
| 3222891 | 12/1983 | Fed. Rep. of Germany ... 15/250.32 |
| 1318978 | 5/1973 | United Kingdom . |
| 1586402 | 3/1981 | United Kingdom . |

OTHER PUBLICATIONS

TRIDON publication (assembly instructions) dated Nov. 15, 1991 via fax transmission on publication.
Copy of Tridon adaptor packaging: Dated Nov. 15, 1991 by fax transmission.

Primary Examiner—Harvey C. Hornsby
Assistant Examiner—Gary K. Graham
Attorney, Agent, or Firm—Howson & Howson

[57] ABSTRACT

A metallic windscreen wiper connecting element comprising an elongate first part having screw connecting means for detachably connecting the first part to a straight wiper arm end portion having cooperating screw holes, a second part spaced from and generally parallel to the first part, detachably connectible to a wiper adaptor, and a reinforced connecting web joining the first and second parts.

11 Claims, 2 Drawing Sheets

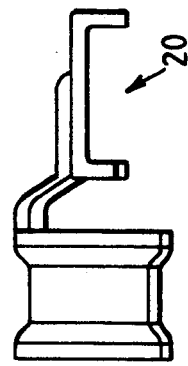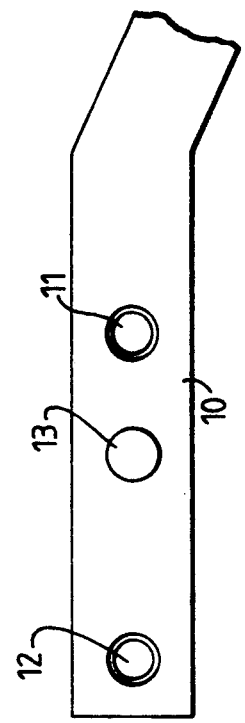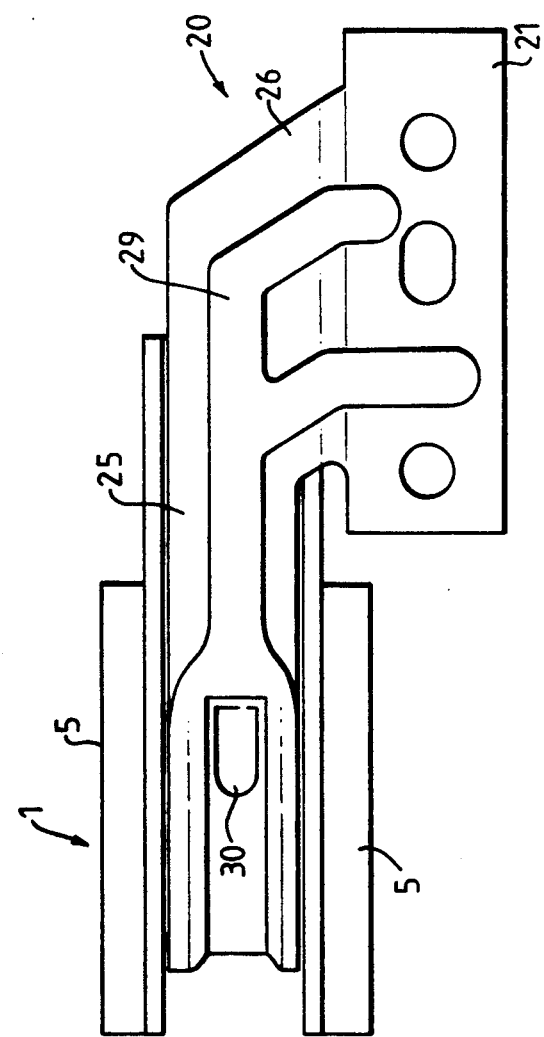

5,299,342

WINDSCREEN WIPER CONNECTING ELEMENT

BACKGROUND OF THE INVENTION

This invention relates to a windscreen wiper connecting element for connecting a straight wiper arm end portion, provided with screw connecting means, in side-by-side relationship with a wiper yoke assembly.

Replacement wiper yoke assemblies are generally provided with a plurality of different adaptors for enabling them to be detachably connected to wiper arms having a variety of different end terminations. One particular type of wiper arm connection involves connecting the wiper arm end portion in side-by-side relationship with the wiper yoke assembly. Generally it is necessary to provide a separate wiper adaptor to accomplish such a wiper arm connection and examples of such known wiper adaptors are shown in GB-A-1586402, GB-A-1318978 and U.S. Pat. No. 4,318,200.

Providing separate wiper adaptors for each type of wiper arm end termination increases the cost of the wiper yoke assembly. It is therefore advantageous to design wiper adaptors which can be connected by themselves, or with the aid of a relatively cheap connecting element, to different types of wiper arm end terminations. In particular for the connection in side-by-side relationship with a wiper yoke assembly of a wiper arm having a straight end portion provided with screw-threaded holes spaced apart along its length, it has been proposed to use a relatively cheap-to-produce connecting element. Such a connecting element converts a conventional wiper adaptor, provided with the wiper yoke assembly for connecting a wiper arm end in the plane of the wiper yoke assembly, into a wiper adaptor suitable for connecting the straight wiper arm end portion in side-by-side relationship with the wiper yoke assembly.

The known connecting elements for converting existing wiper adaptors are metallic and are of the type comprising a first part of generally elongate form for connection to the straight wiper arm end portion, a second part spaced from and generally parallel to the first part for connection to the wiper adaptor, and a connecting web joining the first and second parts together. In use of the wiper yoke assembly, all forces from the wiper arm to the wiper yoke assembly are transmitted via the connecting element and in particular via the connecting web of the connecting element. Heretofore the connecting web has been designed as a planar part and, in order to have sufficient strength in use, it has been necessary for the metal from which the connecting element is made to be relatively thick.

SUMMARY OF THE INVENTION

An object of the present invention is to provide a windscreen wiper connecting element having a reinforced connecting web which enables the connecting element to be made from relatively thin, and therefore relatively cheap, metallic material.

Another object of the present invention is to provide a windscreen wiper connecting element for connecting a straight end portion of a wiper arm in side-by-side relationship with a wiper yoke assembly, the connecting element providing a connection between the wiper arm and a wiper adaptor pivotally connected to the wiper yoke assembly.

A still further object of the invention is to provide a relatively strong construction of connecting element bent or formed from sheet metal material.

According to the present invention there is provided a metallic windscreen wiper connecting element for connecting a straight wiper arm end portion provided with first screw connecting means to a wiper adaptor pivotally connectible to a wiper yoke assembly, the connecting element comprising a first part of elongate form having second screw connecting means cooperable with the first screw connecting means detachably to connect the straight wiper arm end portion to the said first part, a second part spaced from, and disposed generally parallel to, the first part and having connecting means for detachably connecting the second part to the wiper adaptor and a connecting web connecting said first and second parts together, the connecting web having a non-planar, reinforced form for reinforcing the connection between said first and second parts.

Preferably the connecting web is provided with at least one reinforcing rib extending between said first and second parts. Suitably the first and/or second parts are also reinforced. Typically, for example, the said second part has longitudinally extending rib means preferably connecting with said at least one reinforcing rib. The at least one reinforcing rib may also conveniently extend into the said first part.

Suitably the said second part is of hook-like form for connection to a hook end wiper arm adaptor.

Conveniently the said first part is at least partly of channel section. For example, the first part may have opposite end portions each of channel section and a central portion to which the connecting web is joined.

Preferably the second screw connecting means comprise at least two spaced apart holes through which screw-threaded members are intended to pass for engagement in screw-threaded holes formed in, and constituting the first screw connecting means of, said straight wiper arm end portion.

BRIEF DESCRIPTION OF THE DRAWINGS

Embodiments of the invention will now be described, by way of example only, with particular reference to the accompanying drawings, in which:

FIGS. 4 and 5 are views from below and the front, respectively, of the windscreen wiper connecting element shown in FIG. 1, and FIG. 6 an exploded view from above of the connecting element connected to a wiper adaptor and ready for connection to a straight wiper arm end termination by screw connecting means.

DESCRIPTION OF THE PREFERRED EMBODIMENTS

Figure 1:
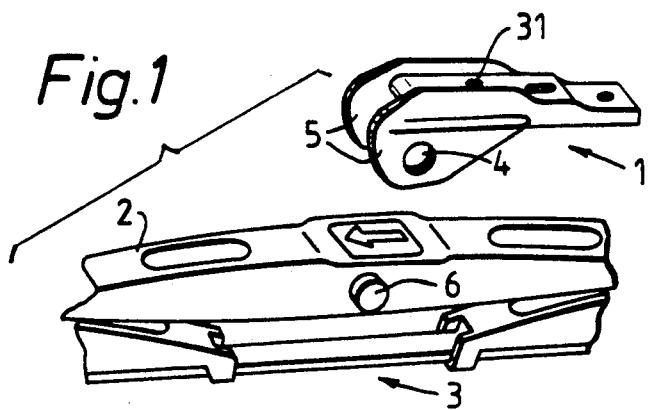
FIG. 1 is an exploded schematic view on a reduced scale showing a central part of a wiper yoke assembly and a straddle type wiper adaptor suitable for connection to the wiper yoke assembly.
Figure 2:
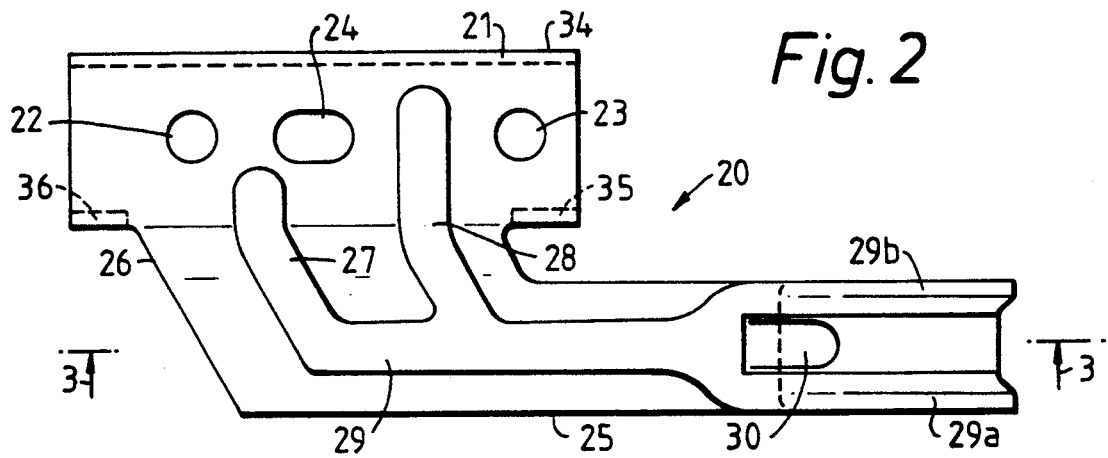
FIG. 2 is a view from above of a metallic windscreen wiper connecting element according to the invention.

FIG. 1 shows a known straddle type wiper adaptor 1 which is detachably connectible to the main yoke 2 of a wiper yoke assembly 3. The adaptor 1 is made generally of plastics material and has sockets 4 formed in opposed side walls 5. The side walls 5 are intended to embrace opposite sides of the main yoke 2 so that studs 6 projecting from the sides of the main yoke are detachably engaged in the sockets 4. When so connected, the wiper adaptor 1 is pivotally mounted on the main yoke 2.

The wiper adaptor 1 enables the connection thereto either of conventional bayonet type wiper arm terminations in an elongate socket of the wiper adaptor or of "U-type" or "hook-type" wiper arm terminations. Primarily the wiper adaptor 1 is designed to connect the wiper arm termination so that it lies in substantially the same plane as that of the wiper yoke assembly.

In order to enable the connection to the wiper yoke assembly of a straight wiper arm end portion 10 (see FIG. 6) having spaced apart screw holes 11 and 12 and a stud 13 therein so that the wiper arm end portion is disposed in side-by-side relationship with the wiper yoke assembly, there is provided a metallic windscreen wiper connecting element 20 (see FIGS. 2 to 6). The connecting element 20 is formed from sheet metal and comprises a first part 21 of elongate form having spaced apart holes 22, 23 and 24 therein, a second part 25 spaced from, and generally parallel to, the first part 21 and providing a hook-type end termination and a connecting web 26 joining the two parts 21 and 25 together. The hook type end termination includes a downwardly turned end portion 25a connected by a curved connecting portion 25b to an elongate portion 25c of the second part 25. The sheet metal of the connecting element is bent or formed so that the connecting web is provided with two reinforcing ribs 27 and 28 which extend at least partly across the first part 21. At their other ends, the reinforcing ribs 27 and 28 join a cental lengthwise extending reinforcing rib 29 formed in the second part which branches into two edge reinforcing ribs 29a and 29b which extend around the hook-type end of the connecting element.

In order to connect the wiper arm end portion 10 to the first part 21, the end portion 10 is positioned beneath the bridging first part 21 with the screw holes 11 and 12 aligned with the holes 22 and 23, respectively, and with the stud 13 projecting through the hole 24. Screw-threaded members, e.g. bolts 38 and 39 (FIG. 6), are then screwed through screw threaded holes 11 and 12 into the screw holes 22 and 23 to connect the first part to the wiper end portion 10.

A downwardly projecting tab 30 is formed in the elongate portion 25c of the second part 25 for location in a hole 31 of the wiper adaptor 1 to releasably lock the connecting element 20 on the adaptor 1 when the hook-type end extends around the body of the adaptor. Conventionally the hole 31 is provided to receive a stud at one end of a bayonet-type wiper arm end connection. However the provision of the tab 30 for location in this hole 31 is believed to be novel in a hook-type end connection. To assist fitting of the hook-type end on the adaptor 1, the endmost part of the hook-type end is bent downwardly as can be clearly seen in FIGS. 3 and 4.

Figure 3:
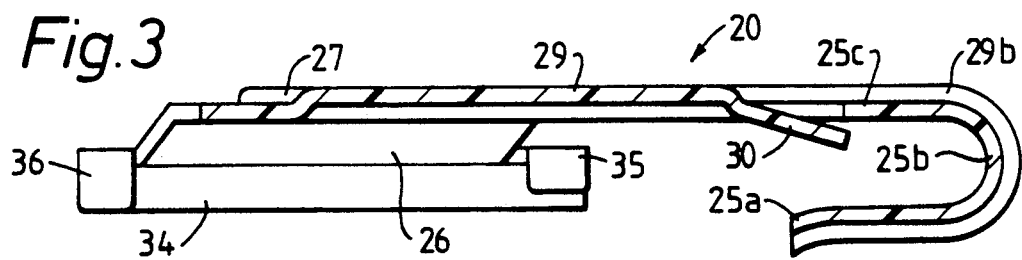
FIG. 3 is a sectional view taken on the line 3—3 of FIG. 2.
Figure 4:
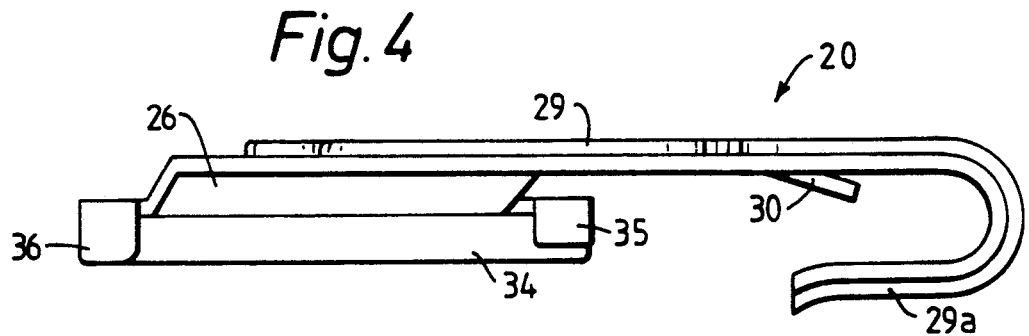

In order to further reinforce the first part of the connecting element 20 and to assist connection of the straight wiper arm end portion 10, the first part 21 has a channel section form along at least part of its length. As can be seen in FIG. 3, the edge of the first part 21 remote from the second part 25 is turned downwardly along its length to form a side wall 34 whereas the edge of the first part 21 which is nearest the second part 25 is turned downwardly only at opposite end portions to form spaced apart side walls 35 and 36. The connecting web 26 is joined to the first part along a major part of the length of the latter between the side walls 35 and 36.

In particular, the web 26 is joined to the first part 21 for a distance at least as far as the spacing between the connecting holes 22 and 24.

It will be appreciated that the connecting element 20 is strengthened by the provision of the reinforcing ribs 27–29 and by the channel shape form of the first part 21. The reinforced structure of the connecting element enables it to be made from thinner metallic material than would normally be possible.

The connecting element may be modified in many ways. For example, the second part could terminate in a bayonet-type connection instead of the hook-type connection shown. Also the connecting element could be reinforced in other ways. For example, the connecting web could have a channel shaped form or any other non-planar design, although the reinforcing ribs hereinbefore described have proven to be particularly effective.

I claim:

1. A metallic windscreen wiper connecting element for connecting a straight wiper arm end portion to a wiper adaptor pivotally connectible to a wiper yoke assembly, the connecting element comprising a first part of elongate form having means for securing said first part, by screw connecting means, to the straight wiper arm end portion, a second part of elongate form spaced from, and disposed generally parallel to, the first part and having connecting means for detachably connecting the second part to the wiper adaptor, and a connecting web connecting said first and second parts together, the connecting web having at least one reinforcing rib raised from the web and extending continuously across the web, from said first part of the connecting element to said second part, and into each of said first and second parts for increasing the rigidity of said web.

2. A connecting element according to claim 1, in which said second part has longitudinally extending rib means for reinforcing said second part.

3. A connecting element according to claim 2, in which said longitudinally extending rib means for reinforcing said second part is connected to, and continuous with, said at least one reinforcing rib.

4. A connecting element according to claim 1, in which the said second part has a hook-type termination.

5. A connecting element according to claim 4, in which the hook-type termination has an elongate first portion, a terminating second portion spaced from the first portion and a curved connecting portion joining the first and second portion, the first portion having tab means directed towards the second portion for location in a cooperating hole of a wiper adaptor.

6. A connecting element according to claim 1, in which said first part is of channel section along at least part of its length.

7. A connecting element according to claim 1 wherein said securing means comprises at least two spaced apart holes in said first part of the connecting element, and screw-threaded holes formed in said straight wiper arm end portion, said screw-threaded holes being alignable with said spaced apart holes.

8. A metallic windscreen wiper connecting element for connecting a straight wiper arm end portion to a wiper adaptor pivotally connectible to a wiper yoke assembly, the connecting element comprising a first part of elongate form detachably connectible, by screw connecting means, to the straight wiper arm end portion, a second part of elongate form spaced from, and disposed generally parallel to, the first part and having connecting means for detachably connecting the second part to the wiper adaptor, and a connecting web connecting said first and second parts together, the connecting web having at least one reinforcing rib extending continuously across the web, from said first part of the connecting element to said second part, and into each of said first and second parts;

in which said second part has longitudinally extending rib means for reinforcing said second part, and a pair of longitudinally extending opposite edges;

in which said longitudinally extending rib means for reinforcing said second part is connected to, and continuous with, said at least one reinforcing rib; and in which said longitudinally extending rib means for reinforcing said second part comprises a central, longitudinally extending rib connected to, and continuous with, said at least one reinforcing rib, and in which said longitudinally extending rib means for reinforcing said second part branches along its length to provide two ribs extending longitudinally along the edges of said second part.

9. A metallic windscreen wiper connecting element for connecting a straight wiper arm end portion to a wiper adaptor pivotally connectible to a wiper yoke assembly, the connecting element comprising a first elongate part detachably connectible, by screw connecting means, to the straight wiper arm end portion, a hook-shaped second elongate part spaced from, and disposed generally parallel to, the first part and having an elongate first portion having opposite side edges, an underlying second portion and a curved portion joining the first and second portions, said second portion and curved portion also having opposite side edges, and a connecting web connecting the first and second parts together, the hook-shaped second part having reinforcing rib means comprising a first rib portion extending longitudinally along said elongate first portion and centrally located between said opposite side edges of said elongate first portion, said first rib portion being bifurcated into two longitudinally extending rib portions extending along a part of said elongate first portion and along said side edges of said second portion and said curved portion, and connecting means, for detachably connecting the second part to the wiper adaptor, comprising tab means formed in said first portion between said two longitudinally extending rib portions, and directed toward said underlying second portion of the hook-shaped second part, for location in a hole formed in the wiper adaptor intended to receive a stud of a wiper arm bayonet connection.

10. A metallic windscreen wiper connecting element according to claim 9 in which said connecting web has a reinforcing rib extending across said web and into said second part, the reinforcing rib being continuous with said first rib portion.

11. A metallic windscreen wiper connecting element for connecting a straight wiper arm end portion to a wiper adaptor pivotally connectible to a wiper yoke assembly, the connecting element comprising a first part of elongate form detachably connectible, by screw connecting means, to the straight wiper arm end portion, a second part of elongate form spaced from, and disposed generally parallel to, the first part and having connecting means for detachably connecting the second part to the wiper adaptor, and a connecting web connecting said first and second parts together, the connecting web having at least one reinforcing rib extending across the web into each of said first and second parts, in which said second part has longitudinally extending rib means for reinforcing said second part, and a pair of longitudinally extending opposite edges; in which said longitudinally extending rib means for reinforcing said second part is connected with said at least one reinforcing rib; in which said longitudinally extending rib means for reinforcing said second part comprises a central, longitudinally extending rib connected to said at least one reinforcing rib; in which said longitudinally extending rib means for reinforcing said second part branches along its length to provide two ribs extending along said longitudinally extending edges; in which the said second part has a hook-type termination; in which the hook-type termination has an elongate first portion, a terminating second portion spaced from the first portion and a curved connecting portion joining the first and second portion, the first portion having tab means directed towards the second portion for location in a cooperating hole of a wiper adaptor; in which said tab means is located between said two ribs; and in which said at least one reinforcing rib is continuous with said central, longitudinally extending rib.

* * * * *

UNITED STATES PATENT AND TRADEMARK OFFICE
CERTIFICATE OF CORRECTION

PATENT NO. : 5,299,342

DATED : April 5, 1994

INVENTOR(S) : Cedric S. K. Charng

It is certified that error appears in the above-identified patent and that said Letters Patent is hereby corrected as shown below:

Column 3, line 42, "then screwed through screw threaded holes 11 and 12 into the screw holes 22 and 23" should read --then screwed through the holes 22 and 23 into screw threaded holes 11 and 12--

Signed and Sealed this

Twenty-sixth Day of July, 1994

Attest:

BRUCE LEHMAN

Attesting Officer

Commissioner of Patents and Trademarks